United States Patent [19]

Nakamigawa

[11] Patent Number: 5,307,486
[45] Date of Patent: Apr. 26, 1994

[54] METHOD FOR UPDATING AN INDEX TREE STRUCTURE OF DATA BASED ON NODE SIZES

[75] Inventor: Tomoki Nakamigawa, Tokyo, Japan

[73] Assignee: Kabushiki Kaisha Toshiba, Kawasaki, Japan

[21] Appl. No.: 908,880

[22] Filed: Jul. 7, 1992

Related U.S. Application Data

[63] Continuation of Ser. No. 434,025, Nov. 9, 1989, abandoned.

[30] Foreign Application Priority Data

Nov. 11, 1988 [JP] Japan .................. 63-285516

[51] Int. Cl.$^5$ .................. G06F 7/00; G06F 7/14; G06F 7/24; G06F 12/08
[52] U.S. Cl. .................. 395/600; 395/425; 364/251.6; 364/252.4; 364/283.2; 364/DIG. 1; 364/283.1; 364/282.1; 364/222.81; 364/222.82
[58] Field of Search .................. 395/800, 600, 250, 425

[56] References Cited

U.S. PATENT DOCUMENTS

| 4,032,899 | 6/1977 | Jenny et al. .................. 364/200 |
| 4,378,588 | 3/1983 | Katzman et al. .................. 364/200 |
| 4,468,728 | 8/1984 | Wang .................. 395/600 |
| 4,611,272 | 9/1986 | Lomet .................. 395/600 |
| 4,677,550 | 6/1987 | Ferguson .................. 364/200 |
| 4,879,561 | 11/1989 | Inkol .................. 342/195 |
| 4,914,569 | 4/1990 | Levine et al. .................. 364/200 |
| 4,945,475 | 7/1990 | Bruffey et al. .................. 395/600 |
| 5,089,952 | 2/1992 | Bozman .................. 395/725 |
| 5,202,986 | 4/1993 | Nickel .................. 395/600 |

OTHER PUBLICATIONS

Computing Surveys vol. 11 No. 2 Jun. 1979 pp. 121-237 "The Ubiquitous B-tree". This document shows various forms of a B-tree.

Primary Examiner—Alyssa H. Bowler
Assistant Examiner—Alpesh M. Shah
Attorney, Agent, or Firm—Cushman, Darby & Cushman

[57] ABSTRACT

In a data processing system for processing data having an index tree structure, a buffer rate is set in advance. When a record is to be inserted or deleted, this buffer rate is used so that a data process to be performed can be selected from a simple insert process, an overflow process, node split process, a simple delete process, an underflow process, and a node concatenation process. With this operation, the data of the index tree structure can be efficiently processed.

6 Claims, 5 Drawing Sheets

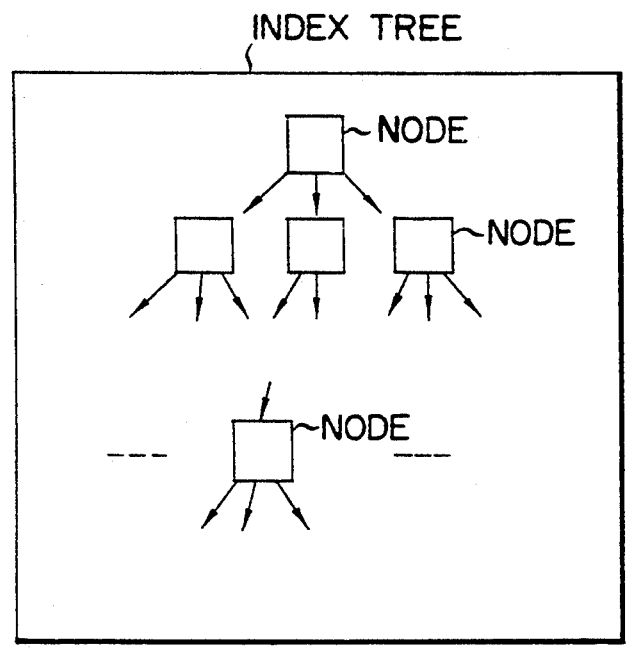
F I G. 1
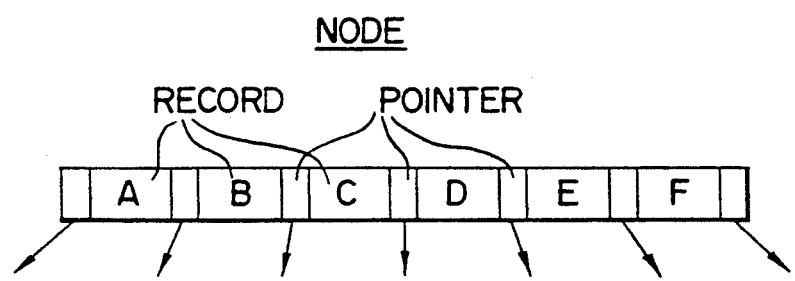
F I G. 2

⇩  B (INSERT)

⇩  B (INSERT)

⇩  B (INSERT)

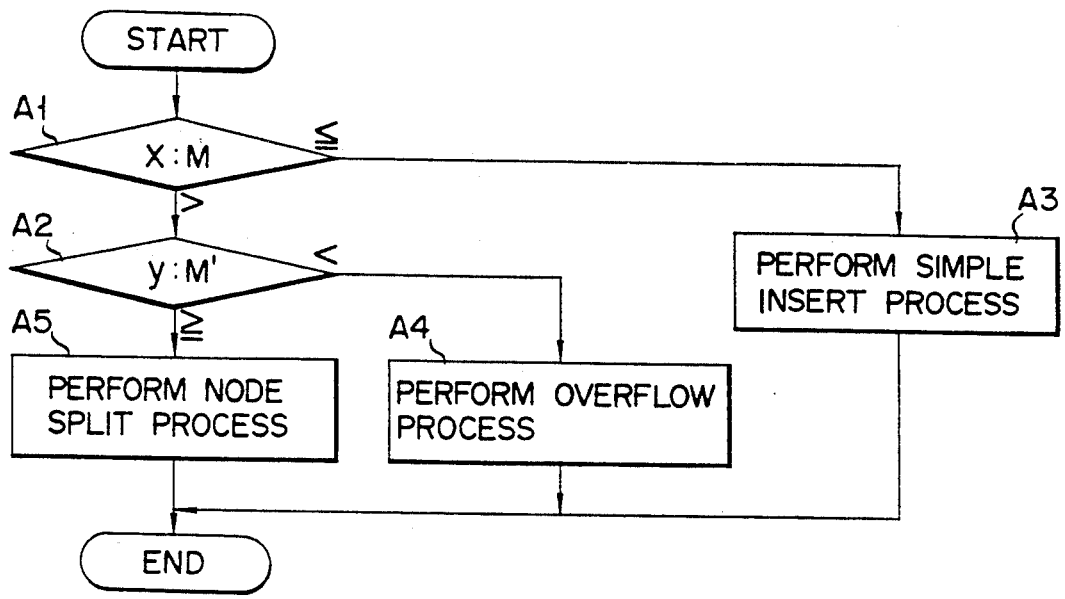
F I G. 10
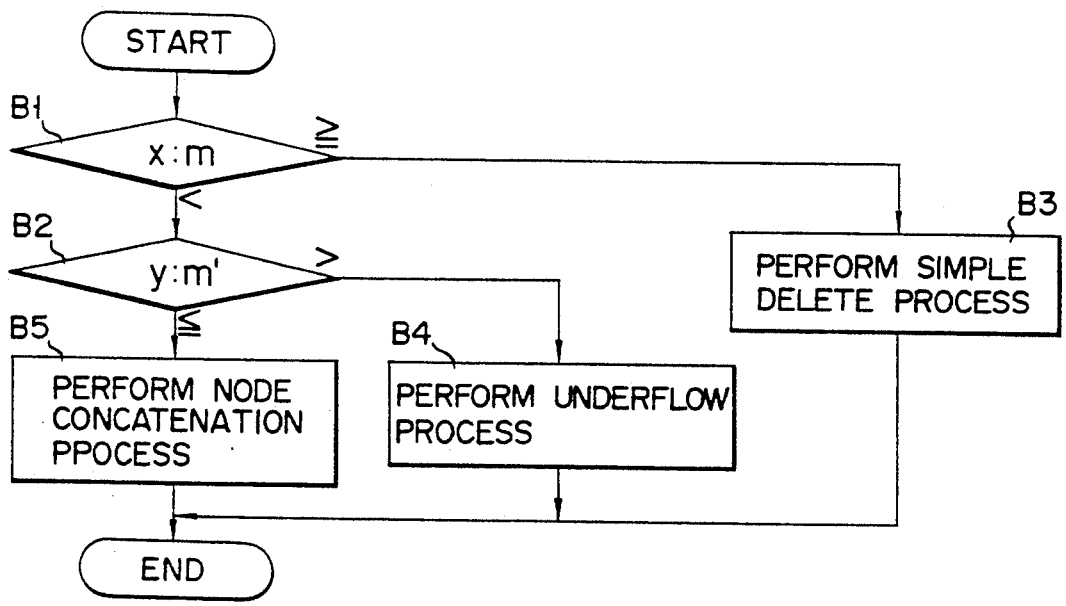
F I G. 11

METHOD FOR UPDATING AN INDEX TREE STRUCTURE OF DATA BASED ON NODE SIZES

This is a continuation of application No. 07/434,025, filed on Nov. 9, 1989, now abandoned.

BACKGROUND OF THE INVENTION

1. Field of the Invention

The present invention relates to a method and system for processing data having an index tree structure.

2. Description of the Related Art

In insertion and deletion of a record of data having an index tree structure, it is always necessary to increase a storage rate of records and decrease the number of orders of an index without rearranging the index. For this purpose, in inserting a record, a simple insert process, an overflow process, and a node split process have been performed. In deleting a record, a simple delete process, an underflow process, and a node concatenation process have been performed.

Data having an index tree structure and examples of the above processes will be described below with reference to FIGS. 1 to 8.

As shown in FIG. 1, an index tree is constituted by a group of nodes which are hierarchically arranged in a file storage unit (not shown). Each node includes a plurality of records and pointers, as shown in FIG. 2.

In a conventional data process, if an upper limit pointer count is set to be M, a lower limit pointer count m can be obtained by the following equation:

$$m = <M/2>$$

where $<\ >$ represents that a decimal fraction is rounded up. In this case, a pointer count x of a predetermined node needs to be set to satisfy $m \leq x \leq M$.

In a simple insert process (see FIG. 3), if (a pointer count of a target node after insertion) $\leq M$, a pointer is inserted in the target node.

In an overflow process (see FIG. 4), if (a pointer count of a target node after insertion) $>M$, and (a pointer count of an adjacent node) $<M$, a predetermined number of records are moved from the target node to the adjacent node.

In a node split process (see FIG. 5), if (a pointer count of a target node after insertion) $>M$, and (a pointer count of an adjacent node) $=M$, a new node is set, and the records of the target node and the adjacent node are split into the three nodes.

In a simple delete process (see FIG. 6), if (a pointer count of a target node after deletion) $\geq m$, a pointer is deleted from the target node.

In an underflow process (see FIG. 7), if (a pointer count of a target node after deletion) $<m$, and (a pointer count of an adjacent node) $>m$, a predetermined number of records are moved from the adjacent node to the target node.

In a node concatenation process (see FIG. 8), if (a pointer count of a target node after deletion) $<m$, and (a pointer count of an adjacent node) $=m$, the target node and the adjacent node are concatenated into one node.

If an index tree is subjected to journal process, in order to decrease the journal amount and increase the efficiency of journal acquisition process, a change in index tree structure and the frequency of record movements between nodes due to a data process must be minimized. However, even if a difference in the number of records movement between a target node and its adjacent node is small, the above-described processes are performed.

For example, in a record insert process (M=50), if the pointer count of a target mode is 50 and that of an adjacent node is 49, an overflow process is performed. As a result, the pointer count of each of the target node and the adjacent node becomes 50. When another record is to be inserted in this target node, a node split process is performed. In this case, if a node split process is executed for the first record insert process, a change in index tree structure becomes smaller, and hence the journal amount is decreased.

Furthermore, in the conventional data process, if only a node split process is executed without performing an overflow, underflow, or node concatenation process, the journal amount can be reduced. However, one node may include only one pointer, and hence the storage rate of records is decreased.

As described above, in processing of records stored in a file storage unit, a demand has arisen for a data processing system which can reduce the journal amount by increasing the storage rate of records and decreasing the frequency of record movements between nodes.

SUMMARY OF THE INVENTION

It is an object of the present invention to provide a method and system for efficiently processing data having an index tree structure.

According to the present invention, there is provided a method for updating an index tree structure of data in a data processing apparatus. The method efficiently retrieves, adds or deletes records arranged in an index tree structure in which a plurality of nodes are hierarchically arranged. The method comprises the steps of using a data processing means to set a maximum size M for storing the records in one of the nodes and a size M' smaller than M for storing the records in an adjacent node thereto. The method further sets a minimum size m for string the records in one of the nodes and a size m' larger than m for storing the records in an adjacent node thereto. The method performs an insert process of the records to one of the nodes based on the sizes M and M', and a delete process of the records from one of the nodes based on the sizes m and m'.

BRIEF DESCRIPTION OF THE DRAWINGS

FIG. 1 is a view showing an index tree structure;
FIG. 2 is a view showing an arrangement of a node;
FIG. 10 is a flow charge showing a record insert process in an index tree processing section;
and
FIG. 11 is a flow chart showing a record delete process in the index tree processing section.

DETAILED DESCRIPTION OF THE PREFERRED EMBODIMENT

An embodiment of the present invention will be described below with reference to the accompanying drawings.

Figure 3:
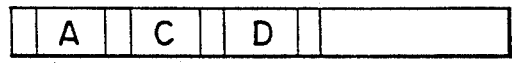
FIG. 3 is a view showing a simple insert process.
Figure 3:
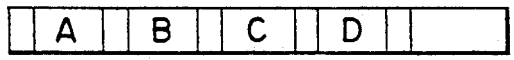
Figure 4:
FIG. 4 is a view showing an overflow process.
Figure 4:
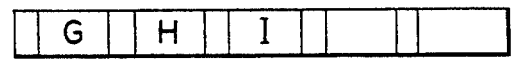
Figure 4:
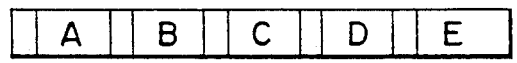
Figure 4:
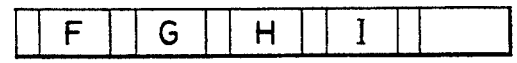
Figure 5:
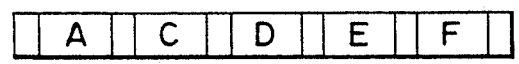
FIG. 5 is a view showing a node split process.
Figure 5:
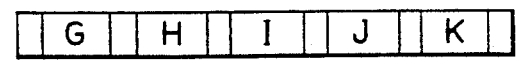
Figure 5:
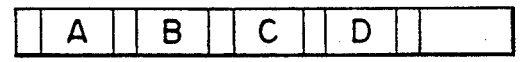
Figure 5:
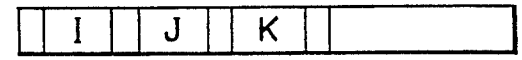
Figure 5:
Figure 6:
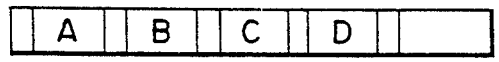
FIG. 6 is a view showing a simple delete process.
Figure 6:
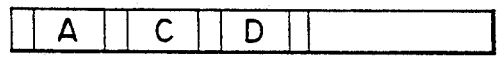
Figure 7:
FIG. 7 is a view showing an underflow process.
Figure 7:
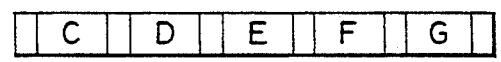
Figure 7:
Figure 7:
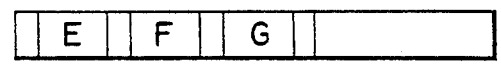
Figure 8:
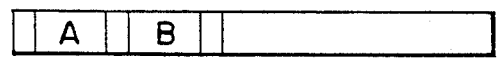
FIG. 8 is a view showing a node concatenation process.
Figure 8:
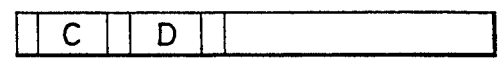
Figure 8:
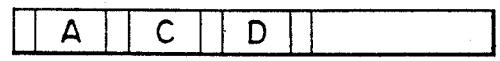
Figure 9:
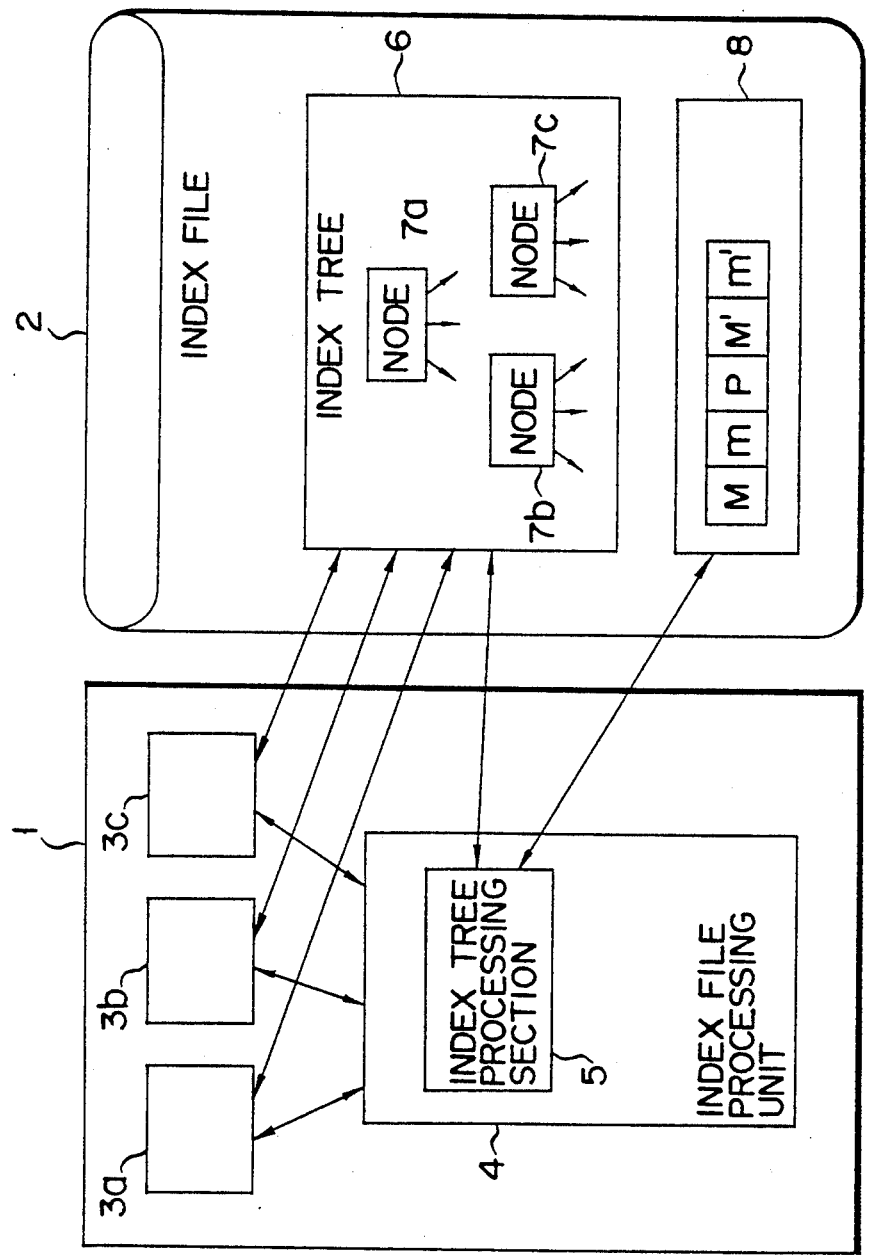
FIG. 9 is a view showing an arrangement of a system according to an embodiment of the present invention.

Referring to FIG. 9, a data processing system 1 comprises application program processing units 3a, 3b, and 3c, and an index file processing unit 4. The data processing system 1 performs retrieval, insertion, deletion, and the like of records with respect to an index file 2 stored in a file storage unit (not shown).

The index file 2 includes an index tree 6 and an index tree control record 8. The index tree 6 is constituted by a plurality of nodes 7a to 7c which are hierarchically linked to each other. Each of the nodes 7a to 7c includes a plurality of records and pointers. The index control record 8 has parameters for determining a process condition for the index tree, namely, an upper limit pointer count M, a lower limit pointer count m, a buffer rate P, and auxiliary constants M' and m'. Note that the auxiliary constants M' and m' are calculated on the basis of the upper limit pointer count M, the lower limit pointer count m, and the buffer rate P.

The application program processing units 3a, 3b and 3c request retrieval, insertion, and deletion of records with respect to the index file 2.

The index file processing unit 4 performs retrieval, insertion, and deletion of records requested by the application program processing units 3a, 3b and 3c, and transfers the processing results to the units 3a, 3b and 3c.

The index tree processing section 5 of the index file processing unit 4 determines a process condition for the index tree by using the index tree control record 8 and performs a corresponding data process.

A record insert process for a target node in the index tree processing section 5 will be described below in accordance with a flow chart shown in FIG. 10.

In step A1, the pointer count of the target node is checked. Note that reference symbol x denotes the pointer count of the target node after insertion; and M, the upper limit pointer count. If $x \leq M$ in step A1, a simple insert process is performed (step A3).

In step A2, the pointer count of an adjacent node is checked. Note that reference symbol y denotes the pointer count of the adjacent node; and M', a pointer count obtained as $<(1-P)M>$. If $y < M'$ in step A2, an overflow process is performed (step A4). If $y \geq M'$ in step A2, a node split process is performed (step A5).

Insertion of the record is performed by the above-described operation.

A record delete process for a target node will be described below in accordance with a flow chart shown in FIG. 11.

In step B1, the pointer count of the target node is checked. Note that reference symbol x denotes the pointer count of the target node after deletion; and m, the lower limit pointer count. If $x \geq m$ in step B1, a simple delete process is performed (step B3).

In step B2, the pointer count of an adjacent node is checked. Note that reference symbol y denotes the pointer count of the adjacent node; and m', a pointer count obtained as $<(\frac{1}{2})M>$. If $y > m'$ in step B2, an underflow process is performed (step B4). If $y \leq m'$ in step B2, a node concatenation process is performed (step B5).

Deletion of the record is performed by the above-described operation.

An index process of the system of the present invention will be described below.

When, for example, the application program processing unit 3a requests insertion or deletion of a record with respect to the index file 2, the index tree processing section 5 of the index file processing unit 4 sets a target node in accordance with a current index tree structure.

In addition, the index tree processing section 5 determines a process for a pointer count by using the upper limit pointer count M, the buffer rate P ($0 \leq P \leq \frac{1}{2}$), the lower limit pointer count m ($\leftarrow (\frac{1}{2})-P)M>$), the auxiliary constant M' ($\leftarrow (1-P)M>$), and the auxiliary constant m' ($\leftarrow (\frac{1}{2})M>$). In this case, symbol $\leftarrow$ represents that a left-hand side is defined by a right-hand side.

In an insert process, as shown in FIG. 10, the pointer count x of the target node after record insertion is compared with the upper limit count M. If $x \leq M$, a simple insert process is performed to insert one pointer in the target node.

If $x > M$, the pointer count y of an adjacent node is compared with the auxiliary constant M'. If $y < M'$, an overflow process is performed to move a predetermined number of records of the target node to the adjacent node.

If $y \geq M'$, a new node is set, and a node split process is performed to split the records of the target node and the adjacent node into three nodes each having a predetermined number of records.

In a delete process, as shown in FIG. 11, the pointer count x of the target node after record deletion is compared with the lower limit count m. If $x \geq m$, a simple delete process is performed to delete one pointer from the target node.

If $x < m$, the pointer count y of the adjacent node is compared with the auxiliary constant $m_,$. If $y > m'$, an underflow process is performed to move a predetermined number of records of the adjacent node to the target node.

If $y \leq m'$, a node concatenation process is performed to concatenate the target node and the adjacent node into one node.

Note that the simple insert process, the overflow process, the node split process, the simple delete process, the underflow process, and the node concatenation process are performed in the same manner as in the conventional data processes shown in FIGS. 3 to 8.

In the above-described embodiment, if, for example, M=50 and P=0.1, M'=45, m'32 25, and m=20. If the pointer count of a target node is 50 and that of an adjacent node is 49 in record insertion, only a node split process is performed without an overflow process, unlike the conventional method. Therefore, the journal amount can be reduced.

According to the system of the above-described embodiment, when insertion or deletion of an pointer is to be performed with respect to each node in an index tree structure in which records arranged in accordance with a relationship in magnitude therebetween are stored to form a hierarchical network, a predetermined buffer rate corresponding to that magnitude is used so that a data process to be performed can be selected from a simple insert process, an overflow process, a node split process, a simple delete process, an underflow process, and a node concatenation process. With this operation, the record storage rate of each node can be kept relatively high. In addition, by reducing the frequency of record movements between nodes, the journal amount can be reduced.

An embodiment of the present invention has been described. However, the present invention is not limited to the embodiment. Various changes and modifications can be made within the spirit and scope of the invention.

What is claimed is:

1. A method for updating an index tree structure in a data processing apparatus which can retrieve, add, or delete records arranged int he index tree structure in which a plurality of nodes are hierarchically arranged, each of the plurality of nodes including a plurality of records sorted in ascending or descending order in accordance with a key value, the method comprising the steps of:

a) setting a maximum size M for storing the records in one of the nodes, and a size M' which is smaller than both M and the potential maximum capacity of an adjacent node for storing the records in the adjacent node, using data processing means;

b) setting a minimum size m for storing the records in the one node, and a size m' which is larger than m for storing the records in the adjacent node, using said data processing means;

c) after said setting steps a) and b), inserting at least one of the records in one of the nodes and shifting records between the nodes to maintain, after said inserting step, a number of records in the one node below M and a number of records in the adjacent node below M' using sad data processing means;

d) after said setting steps a) and b), deleting at least one of the records form one of the nodes and shifting records between the nodes to maintain, after said deleting step, a number of records in the one node above m and a number of records int he adjacent node above m', using said data processing means; and e) recording and updating a record position within the index tree structure.

2. The method according to claim 1, further comprising the steps of:

e) setting a buffer rate, said buffer rate controlling an average number of the total records in the nodes after the steps a)–d) are repeatedly performed; and f) setting the sizes M' and m' based on the set buffer rate.

3. A method for updating an index tree structure in a data processing apparatus which can retrieve, add, or delete records arranged in the index tree structure in which a plurality of nodes are hierarchically arranged, each of the plurality of nodes including a plurality of records sorted in ascending or descending order in accordance with a key value, the method comprising the steps of:

a) setting a maximum size M for storing the records in a target node, and a size M' which is smaller than both M and the potential maximum capacity of an adjacent node for storing the records in the adjacent node thereto, using data processing means;

b) determining if a number of records which exist after an insertion of at lest one of the records in the target one exceeds the maximum size M, using said data processing means;

c) inserting the at lest one record in the target node when it is determined in said step b) that the insertion of the at least one record in the target node does not cause the number of records in the target node to exceed the maximum size M, using said data processing means;

d) determining if a number of records in the adjacent node to the target node exceeds the size M' when it is determined in said step b) that the insertion of the at least one record in the target node causes the number of records in the target node to exceed the maximum size M, using said data processing means;

e) performing an overflow process such that the records, including the at least one record to be inserted, in the target node and the records in the adjacent node are uniformly rearranged in both nodes, when it is determined in said step d) that the number of records in the adjacent node does not exceed the size M', using said data processing means;

f) performing a node split process such that a new node is prepared and the records, including the at least one record to be inserted, in the target node and the records in the adjacent node are rearranged among the target node, the adjacent node and the newly prepared node, when it is determined in said step d) that the number of records int he adjacent node exceeds the size M', using said data processing means; and g) recording and updating a record position within the index tree structure.

4. The method according to claim 3, further comprising the steps of:

g) setting a buffer rate, said buffer rate controlling an average number of the total records in the nodes after the steps a)–f) are repeatedly performed; and h) setting the size M' based on the set buffer rate.

5. A method for updating an index tree structure in a data processing apparatus which can retrieve, add, or delete records arranged in the index tree structure in which a plurality of nodes are hierarchically arranged, each of the plurality of nodes including a plurality of records sorted in ascending or descending order in accordance with a key value, the method comprising the steps of:

a) setting a minimum size m for indicating a minimum number of records in a target node, and a size m' which is larger than m for indicating a minimum number of records in an adjacent node thereto, using data processing means;

b) determining if a number of records which exist after a deletion of at least one of the records from the target node exceeds the minimum size m, using said data processing means;

c) deleting the at least one record in the target node when it is determined in said step b) that the deletion of the at least one record int he target node causes the number of records in the target node to exceed the minimum size m, using said data processing means;

d) determining if a number of records in the adjacent node to the target node exceeds the size m' when it is determined in said step b) that the deletion of the at least one record from the target node does not cause the number of records in the target node to exceed the minimum size m, using said data processing means;

e) performing an underflow process such that the records, including the at least one record to be deleted, in the target node and the records int he adjacent node are uniformly rearranged in both nodes when it is determined in said step d) that the number of records in the adjacent node exceeds the size m', using said data processing means;

f) performing a node concatenation process such that the target node and the adjacent node are concatenated into one node when it is determined in said step d) that the number of records in the adjacent node does not exceed the size m', using said data processing means; and g) recording and updating a record position within the index tree structure.

6. The method according to claim 5, further comprising the steps of:

g) setting a buffer rate, said buffer rate controlling an average number of the total records in the nodes after the steps a)–f) are repeatedly performed; and h) setting the size m' based on the set buffer rate.

* * * * *